United States Patent [19]

Bean et al.

[11] Patent Number: 4,494,189
[45] Date of Patent: Jan. 15, 1985

[54] METHOD AND MEANS FOR SWITCHING SYSTEM CONTROL OF CPUS

[75] Inventors: George H. Bean, Hyde Park; Peter H. Gum, Poughkeepsie, both of N.Y.

[73] Assignee: International Business Machines Corporation, Armonk, N.Y.

[21] Appl. No.: 371,754

[22] Filed: Apr. 26, 1982

[51] Int. Cl.³ .............................................. G06F 9/10
[52] U.S. Cl. .................................................... 364/200
[58] Field of Search ............................... 364/200, 900

[56] References Cited

U.S. PATENT DOCUMENTS 4,042,912 8/1977 Bachman et al. .................. 364/200

Primary Examiner—Thomas M. Heckler
Assistant Examiner—Tim A. Wiens
Attorney, Agent, or Firm—Bernard M. Goldman

[57] ABSTRACT

The embodiment obtains rapid switching between system control programs (SCPs) by switching an address in a prefix register in a CPU of a MP or UP data processing system from a guest SCP's PSA (program save area) to a host SCP's PSA by fetching the host prefix value from a predetermined control block in main storage. The prefix register loading changes the control of the CPU from a preferred guest SCP to a host SCP. This SCP switching is done by hardware and/or microcode means in the CPU. It further detects preset states in the CPU that enable a rapid determination of which SCP is to handle a sensed event, permitting the guest SCP to immediately handle events predetermined to belong to the guest. This manner of CPU control obtains for a preferred guest SCP (such as MVS/370) operating under a host SCP (such as VM/370) nearly the efficiency of standalone execution on the CPU by the preferred guest SCP.

24 Claims, 9 Drawing Figures

METHOD AND MEANS FOR SWITCHING SYSTEM CONTROL OF CPUS

FIELD OF THE INVENTION

This invention relates generally to support means in a uniprocessor or multiprocessor for controlling the switching of system control programs (SCPs) between a guest SCP and a host SCP in a manner that enables the guest SCP to directly execute most of its privileged instructions on System/370 processor hardware without programming simulation.

DESCRIPTION OF THE PRIOR ART

A data processing system which uses the IBM S/370 architecture must have a special page in main storage of 4096 bytes beginning at real address zero for each CPU in the system which is the interface between the CPU hardware and its software operations, and this page is generally called the program save area (PSA). The PSA contains functionally preassigned storage locations, e.g., old and new program status words (PSWs) for the various types of interrupts, channel status word (CSW), channel address word (CAW), machine check and log-out save area, etc., which are specified in a publically available document entitled "IBM System/370 Principles of Operations"(Form No. GA22-7000).

If the system only has a single CPU, i.e., a uniprocessor (UP) system, the CPU's PSA page at real address zero will also be at absolute address zero in main storage, wherein the real addresses used by any SCP running on the CPU to address the PSA will map directly without modification into the absolute addresses of main storage. If the system has plural CPU's i.e. a multiprocessor (MP) system, a SCP running on any CPU in the MP likewise addresses the CPU's respective PSA page using real address zero. Since it is impossible for plural CPU's to have their respective PSAs fit into the single page at the absolute address zero location in main storage, conventional S/370 MPs solve this problem by modifying the SCP real addresses 0-4095 by a prefix value statically contained in a prefix register provided in each CPU. A different prefix value is provided in each CPU so that each CPU has a different absolute address for its PSA. Hence, the plural PSAs in the MP are located at different non-zero absolute addresses in main storage by the different CPU prefix values in the different prefix registers provided in the different CPUs in the MP. The prefix values remain static (unchanged) throughout the MP operation, i.e. after the MP prefix value is initially program loaded into the prefix register for each CPU in the MP. However in an MP, the page at absolute address zero is not used to contain any CPU's PSA, because the prefixed non-zero absolute address locations of the different CPU PSAs entail a reverse-prefix availability by all CPUs to the page at absolute address zero.

Prior UP's do not have any prefix register, because they do not have the need for prefixing, since their real address zero is the same as their PSA absolute address zero.

Among the most widely used S/370 system control programs (SCPs) which can operate on either a UP without prefixing, or on a MP with prefixing, are: (1) the IBM MVS (multiple virtual storage) SCP, and (2) the IBM VM (virtual machine) SCP. Each of these SCPs is designed to be a standalone operating system, i.e. the only operating system in a data processing system. Several years ago at the inception of the VM SCP, it was designed to have the capability of having another SCP run under it on one of its virtual machines, in which case the VM SCP was considered the host SCP and the other SCP (running under VM) was considered the guest SCP. It was recognized that the host SCP must have over-all control of the data processing system to prevent any deadlock conflict in the allocation of system resources between the two SCPs. The early prior art implementation of this host/guest relationship enabled the host (VM) SCP to maintain control over the guest SCP by allowing only the host VM program to control the state of the CPU's hardware PSA, e.g. in a UP only the VM PSA was located at absolute address zero so that only the VM PSA was used by the CPU hardware, such as for the new and old PSW (program status words) on the occurrence of interrupts. Each guest virtual machine running under a VM system also had a PSA, but it was simulated by VM software, which also simulated the guest interruptions and guest privileged instructions, in order to enable the VM SCP to maintain control over the system hardware and software resources. The non-privileged guest instructions were executed with the CPU in problem state, which was their normal operating state. However, the early VM host SCPs also required all guest privileged instructions to operate abnormally with the CPU in problem state because they could affect the state of system resources. Then, whenever any guest SCP attempted to execute any privileged instruction, the CPU problem state caused a program interrupt (i.e. program PSW swap) in the VM host's PSA. This obtained the new program PSW in the VM PSA which called the VM host interrupt handler program, whereby the VM host intercepted and simulated each guest privileged instruction by using software to execute it, instead of executing it directly on the CPU hardware. Although the host VM simulation of the guest's privileged instructions obtained the same programming results for the guest that would have been obtained if the guest had been permitted to directly execute its privileged instructions on the CPU hardware, a significant system performance penalty resulted due to the fact that the simulation resulted in the host SCP having to execute a large number of instructions for each of the guest's privileged instructions, sometimes several hundred host instructions being executed per guest privileged instruction.

It was also recognized that I/O requests by a guest needed to be controlled by the host, since the privileged start I/O (SIO) instruction was used. Therefore, each guest SIO instruction caused a problem state interruption to the host SCP, which intercepted the guest I/O instruction but then the host SCP executed it directly on the CPU hardware in privileged state because I/O operations could not be simulated. When the I/O later responded with an interrupt signal, the host SCP handled the interrupt and posted the result of the I/O operation into the guest SCP which then was enabled to continue its operation with the result of the host controlled I/O operation.

To summarize the early VM operation, the guest's execution of privileged instructions were intercepted and simulated by the host SCP, except the host SCP directly executed the guest I/O requests, due to the guest program always executing with the CPU hardware being in problem state (i.e. PSW problem state bit set on). Nevertheless, the guest perceived of its SCP as executing in privileged state via a simulated guest PSW having its PSW problem state bit set to privileged state. A significant performance penalty accrued to the simulation of guest privileged instructions and the interception of guest I/O operations, since a large number of instructions had to be executed by the CPU hardware in order to simulate the execution of a single guest privileged instruction, e.g. perhaps 100 to one.

A later VM control technique in the prior art provided a PSA swapping method as a way for a guest SCP operating under VM to directly execute guest privileged instructions, provided the system was a UP. It recognized that if a guest PSA could be moved into the UP's absolute address zero when the guest was dispatched by the VM host, the guest would then control the CPU hardware state and would then be able to directly execute guest privileged instructions without host simulation. However, it was also recognized that while the guest was controlling the CPU, conditions would arise which required control to be returned to the VM host by moving the guest PSA out of absolute address zero and moving the host PSA back into absolute address zero to enable the host SCP to regain control of the CPU. However, to do this required changes within the guest SCP to recognize the special events requiring host control, in order to initiate the VM host PSA movement back to absolute address zero to restore CPU control to the host. It was also recognized in this situation that guest I/O requests and their resulting I/O interrupts, for I/O exclusively dedicated to the guest, could be executed directly under the guest SCP, as long as the guest SCP was modified to mark those I/O addresses which were exclusively dedicated to the guest.

Thus the PSA swapping method had the limitations: (1) it was operable only on a UP since MPs do not use absolute address zero for a PSA, (2) the guest SCP had to be specially modified to a form different from its standalone version, and (3) guest PSA control of the CPU was risky in regard to system integrity, because it gave the guest operation direct control over the entire system. It was apparent that such guest operation would have to be restricted to a preferred guest that was "well behaved", such as MVS.

The publically available Amdahl VM/PE software product uses the UP PSA swapping method of overlaying the VM PSA with the MVS PSA in the page frame at absolute address zero in main storage whenever its special software modifications in the preferred guest MVS software recognize a special event that requires the guest to relinquish CPU control back to the host VM system. The MVS software modifications recognize a subset of guest privileged instructions and I/O interrupts from host or other guest useable I/O which can not be handled by the MVS guest and need their recognition built into the MVS guest software to enable the guest to switch the CPU control back to the VM host. The VM and MVS software is modified in VM/PE to identify which I/O channels are exclusively dedicated to MVS guest control. Each time the MVS guest issues an I/O instruction, MVS is modified to call the VM host (i.e. VM PSA overlay) to execute the I/O instruction. If an I/O interrupt is received, the addressed channel is tested by MVS modified software to determine if it is an MVS dedicated channel or not. If an MVS guest dedicated channel is identified, the MVS guest can then receive and handle the I/O interrupt. If a non-MVS dedicated channel is identified, the MVS guest modifications initiate the VM PSA overlay at absolute address zero to return CPU control to the VM host which then handles the I/O interrupt. Whenever the guest PSA is overlayed, it is moved and saved in a main storage page frame allocated for the guest PSA save purpose, while another page frame is allocated for saving the VM PSA. Overlaying of the PSA may be done by two main storage move operations by executing two move character long (MVCL) instructions: (1) moving the 4KB MVS PSA from the absolute address zero page frame to the allocated MVS PSA save page frame, and (2) moving the 4KB VM PSA from the VM PSA save page frame to the absolute address zero page frame. A reverse type of PSA swap is needed each time the VM host dispatches the virtual machine using the MVS preferred guest SCP. No PSA swap occurs if the VM host dispatches some other guest or one of the host tasks.

Problems existing with the prior PSA swapping method for reducing MVS preferred guest simulation under VM are:

1. This prior method requires guest software modification to support selective I/O channel dedication to the guest SCP.
2. This prior method is not useable by MP, because MP requires plural PSA pages which cannot be located at absolute address zero. (Thus, this prior method is only useable in a UP.)
3. This prior method requires modifications within the MVS guest software in order to enable the guest to transfer control to the VM host SCP software upon the recognition of certain events, such as selective I/O dedicated to the host SCP. Such modification reduces the integrity and reliability of the guest software and make its future maintenance more difficult because it requires MVS under VM to be different from standalone MVS.
4. This prior method reduces system performance awaiting PSA swapping moves to transfer the CPU control between the guest and host.
5. This prior method uses two save page frames totaling 8KB of main storage to decrease the amount of main storage available to other functions.

The loss in system integrity and reliability by a specially modified preferred guest operating in privileged state may be understood from the following statements: Each modification to a complex program, like MVS, increases the statistical likelihood of bugs occurring in the program. Special modifications, which are used on a limited basis, limit the opportunity to discover and fix such software bugs. The probabilities of disasterous consequences (e.g. system crashes) due to such bugs are increased with a preferred guest controlling the CPU and thereby having access to all of main storage, which includes the areas in main storage used by the host and other guests that should not be accessible to the preferred guest. The early VM/370 simulation of a MVS guest in problem state had the advantage of assuring the integrity of the system by always having the VM host control all guest accesses of main storage, which prevented guest incursion into areas in main storage not controlled by that guest; then VM restrained the guest requested storage accesses to only the areas which were assigned to the requesting guest (except for guest I/O channel programs for preferred guests). But now, when the guest executes in supervisory state, storage protection by storage protect keys is not operable against the preferred guest under S/370 architecture, since the privileged state preferred guest now runs with key zero, so that an erroneous store access by the guest can destroy programs and data of the host or another guest in main storage and cause them to fail when they are dispatched. The choice of running an MVS preferred guest in privileged state (with the resulting inherent destructive authority over the system) was permitted only because the MVS guest was recognized to be "well behaved" (due to years of APR and PTF refinements by thousands of users of the standalone MVS SCP), so that in practice no significant loss in system integrity or reliability was expected to occur in the trade-off of (1) the prior protective host VM intervention on MVS privileged instructions (when MVS was simulated in problem state) for (2) the current much faster execution of the MVS privileged instructions (and MVS dedicated I/O) in supervisory state by (3) accepting the low integrity reduction risk involved with a "well behaved" guest. However, when the guest version of MVS is made different from the "well behaved" standalone version of MVS, the guest will not necessarily have the "well behaved" quality and the risk may significantly increase.

SUMMARY OF THE INVENTION

The subject invention provides a hardware and/or microcode method of enabling a guest SCP (such as MVS) to obtain the efficiency of running a CPU in privileged state even though it is operating under a host SCP (such as VM) with the following objects and advantages over the prior PSA swapping method:

1. to permit the guest SCP to handle guest dedicated I/O on an MP (multiprocessor) or AP (attached processor) system as well as on a UP (uniprocessor) with special CPU hardware and/or microcode support;
2. to allow the standalone version of a guest SCP to handle guest dedicated I/O under a host SCP without requiring special software modification in the guest SCP, in order to avoid the additional maintenance and increased risk in having a separate version for the guest SCP;
3. to eliminate the PSA move operations when switching CPU control between guest and host SCPs for supporting non-guest dedicated I/O interruptions occurring during guest operation;
4. to permit CPU control to be switched from a currently controlling SCP to another SCP which need not be the SCP which controlled the CPU immediately prior to the currently controlling SCP;
5. to improve CPU performance by reducing the time needed to switch the control of a CPU from a S/370 guest SCP to a S/370 host SCP by using hardware and/or microcode to perform the switching without software intervention when an I/O interruption is determined by special CPU hardware to not be from a guest dedicated I/O channel.
6. to enable an MP or AP to have its different CPUs independently controlled by any of a plurality of available SCPs.

The avoidance of special modifications to a guest SCP to support guest dedicated I/O has significant pragmatic importance, since a complex guest (such as MVS) periodically undergoes updates to its standalone version to fix newly found bugs and to increase its functions. If the standalone version of a SCP must be modified to enable it to be used as a preferred guest in order to support guest-to-host CPU control switching, the consequence of requiring the special modification to the standalone version to enable it to operate as a guest results in an additional cause of software unreliability, because it has been found from long experience that each change to software increases the statistical likelihood of software operational failure due to unforeseen adverse software interactions caused by modifications.

The ability of a guest SCP to run on MP hardware is increasingly important as users change from UP to MP in order to obtain the better performance and availability of MP operation.

This invention requires channel dedication selection controls and a prefix register in each CPU in a data processing system, regardless of whether there is one or plural CPUs in the system. The invention provides PSA locations in absolute main storage for each SCP in the system. The method of this invention switches the absolute address in the prefix register in a CPU from one PSA to another PSA in order to switch control of the CPU from one SCP to another SCP without using any PSA move operations. The invention may be used to switch CPU control among any number of SCPs, with two being the minimum number and the number used in the preferred embodiment. For example, if three different SCPs are available to a CPU, there will be three PSAs in three different page frames in main storage assigned to a CPU, and CPU control may be switched from one SCP to any other SCP by merely changing the address in the CPU's prefix register to the PSA of the other SCP to which the CPU is to be switched. If in this example, the CPU is the only CPU in the system (i.e. a uniprocessor system), then the three PSAs are the only PSAs in main storage. However, if the example of three SCPs is extended to a multiprocessor having, for example, four CPUs, then each CPU may use three PSAs for a maximum of twelve PSAs provided in main storage in order to provide total flexibility in allowing any CPU to switch among the three SCPs independently of any other CPU.

If less than twelve PSAs are provided for the three SCPs and four CPUs in this example, then all CPUs cannot simultaneously run a SCP if all of its PSAs are currently being used by other CPUs; and additional system programming is provided for assigning and keeping track of the PSAs among the CPUs.

Thus, this invention can switch the control of a CPU from a first SCP to a second SCP to a third SCP in that order while always being able to go back to the first SCP (which may be the host SCP) by fetching the host prefix valve from a predetermined location in main storage.

These and other objects, features and advantages of the invention may be more fully understood and appreciated by considering the following detailed description in association with the accompanying drawings.

DETAILED DESCRIPTION OF THE EMBODIMENT

The preferred embodiment is built into the hardware and micro-code of a large CPU, such as an IBM 3033 CPU or an IBM 3081 CPU. This microcode senses special events while the CPU is running the MVS/370 system control program (SCP) as a preferred guest virtual machine under a host VM/370 SCP. Upon the detection by this invention of a special event while the preferred guest SCP is controlling the CPU that the guest SCP is not intended to handle, this embodiment's microcode performs a CPU control switch that puts the host SCP in control of the CPU. The performance of the data processing system is thereby significantly improved. The special events that can cause a CPU control switch from the guest SCP to the host SCP are: (1) the guest execution of certain privileged instructions or initiation of a guest wait state, (2) an I/O interrupt from a channel not dedicated to the guest SCP, and (3) certain external signals and timer interrupts.

The preferred embodiment microcode performs a CPU control switch in one direction, which is from the guest MVS/370 SCP to the host VM/370 SCP.

Whenever a CPU control switch is required in the opposite direction (i.e. from the host VM/370 SCP to the guest MVS/370 SCP), it is presumed to be done by the host VM/370 SCP software executing a set prefix (SPX) instruction.

The preferred guest differs from other guests operating under the host SCP in that the preferred guest is the only user of the system main storage that is assigned absolute storage locations contiguously up from absolute zero to a predetermined maximum.

Figure 9:
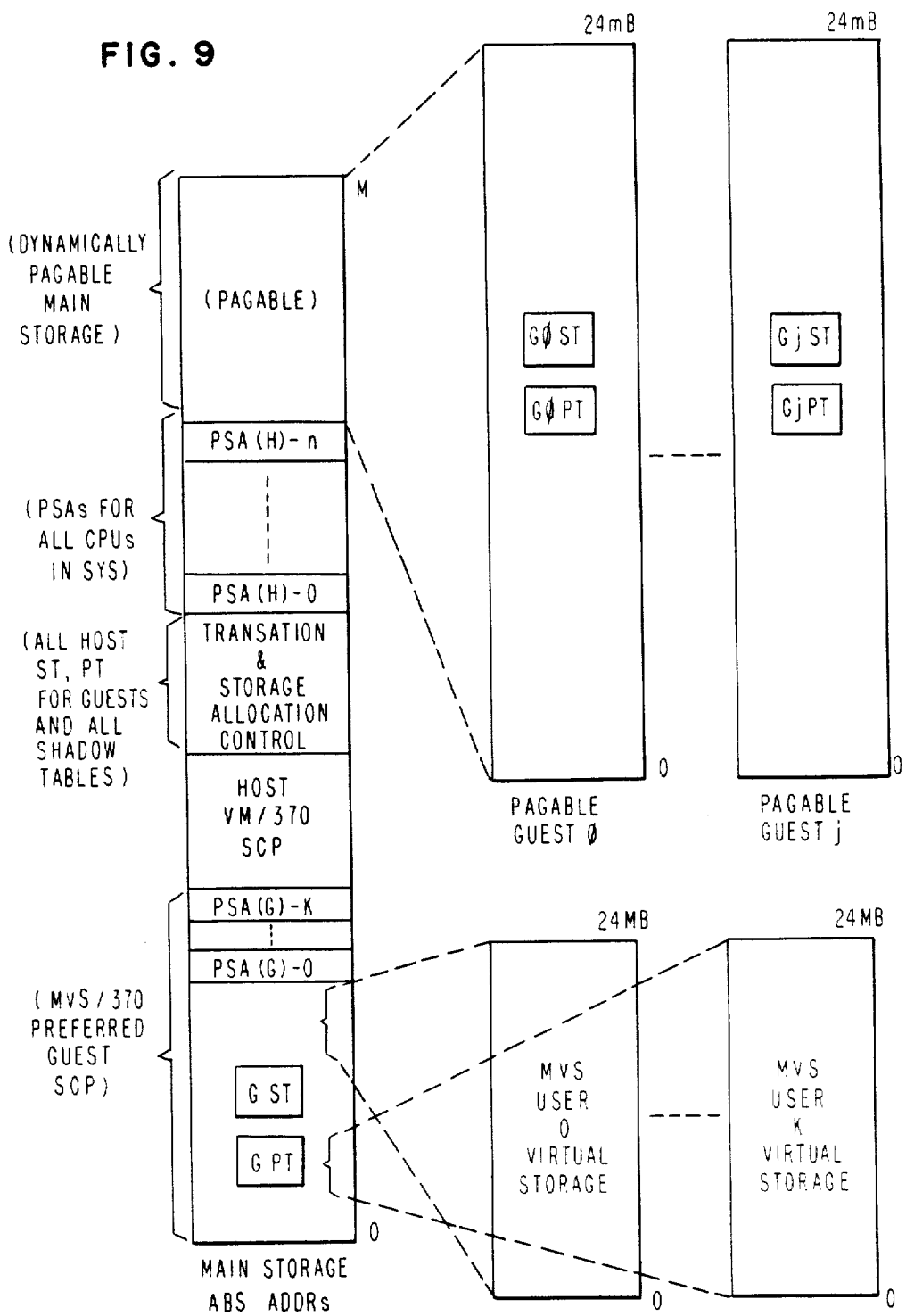
FIG. 9 is a storage address map for a host VM/370 SCP with non-preferred guests and a MVS/370 preferred guest SCP (i.e. in V=R area).

The guest SCP of interest to this embodiment is established by the commercial IBM VM/370 as a normally established V=R guest. FIG. 9 illustrates a main storage map showing absolute address locations for the preferred guest, pageable guests and host VM/370 nucleus in relation to the plural guest virtual storages. FIG. 9 generally illustrates the mapping into main storage (using absolute addresses) of a VM/370 controlled MP system containing: translated MVS preferred guest virtual addresses, pageable guest translated virtual addresses, and host VM/370 SCP real addresses. Each SCP in the system requires a PSA page frame for each of its CPUs to provide an interface between each CPU and the SCP. This invention allows any PSA page of any SCP to be located in any page frame in main storage. This is done in this this invention by dynamically loading the CPU's prefix register with the address of the PSA of whichever SCP is to be given control over the respective CPU at any required time. Thus, the use of this invention in a uniprocessor (UP) requires a prefix register in the UP, even though prior UPs have not contained any prefix register, since prefix registers have previously been used only statically for adapting CPUs to an MP system. To adapt the main storage in FIG. 9 to a UP for a system with two SCPs requires only two PSAs in main storage, which are the guest PSA shown as PSA(G)-0 and the host PSA shown as PSA(H)-0. For an MP, an additional host PSA, i.e. PSA(H), is provided for each additional CPU.

Figure 1:
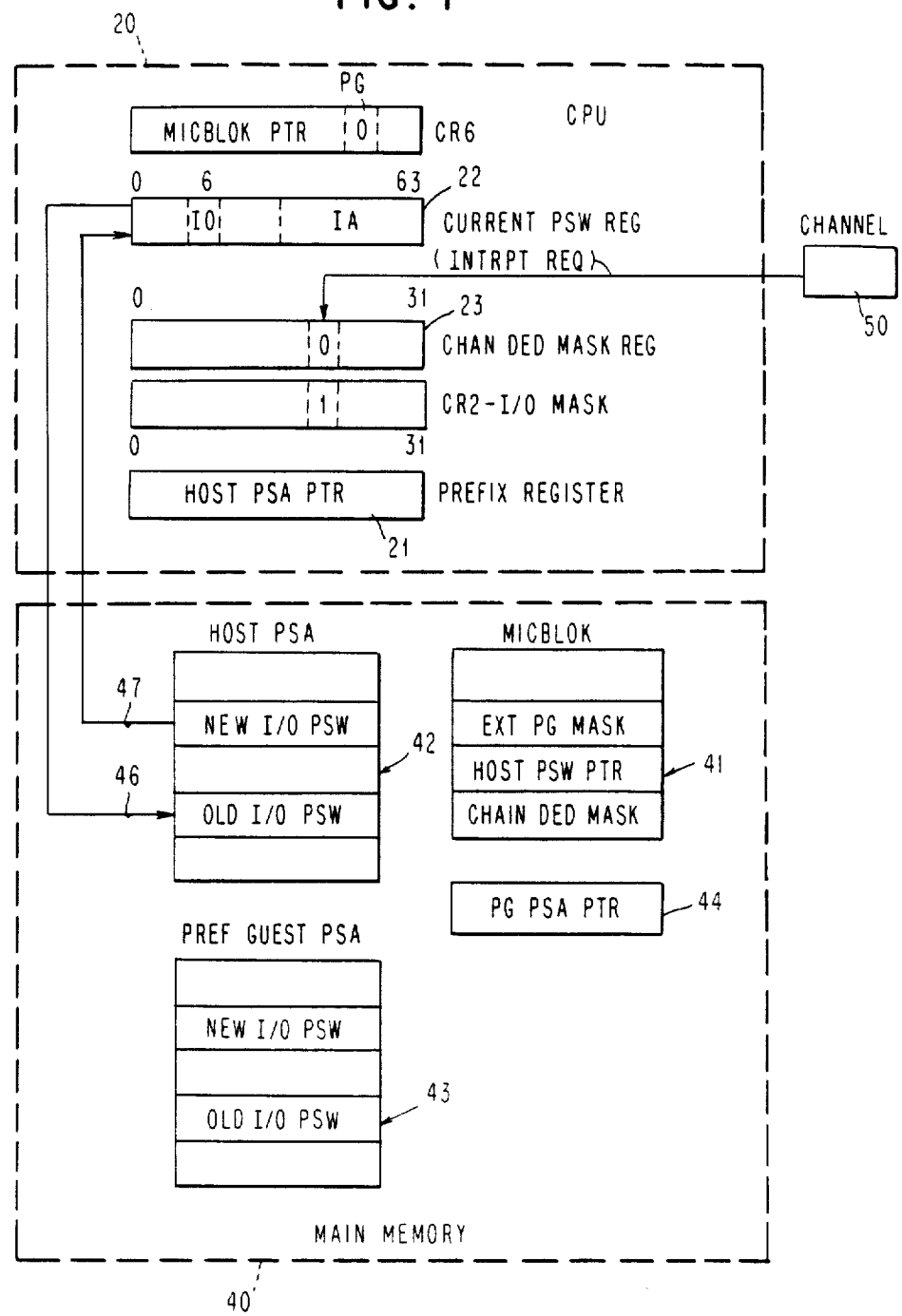
FIG. 1 is an operational diagram representing the special case of an I/O interrupt by a channel not dedicated to a guest system control program (SCP) when a host SCP is controlling the CPU, which does not require a CPU control switch.
Figure 2:
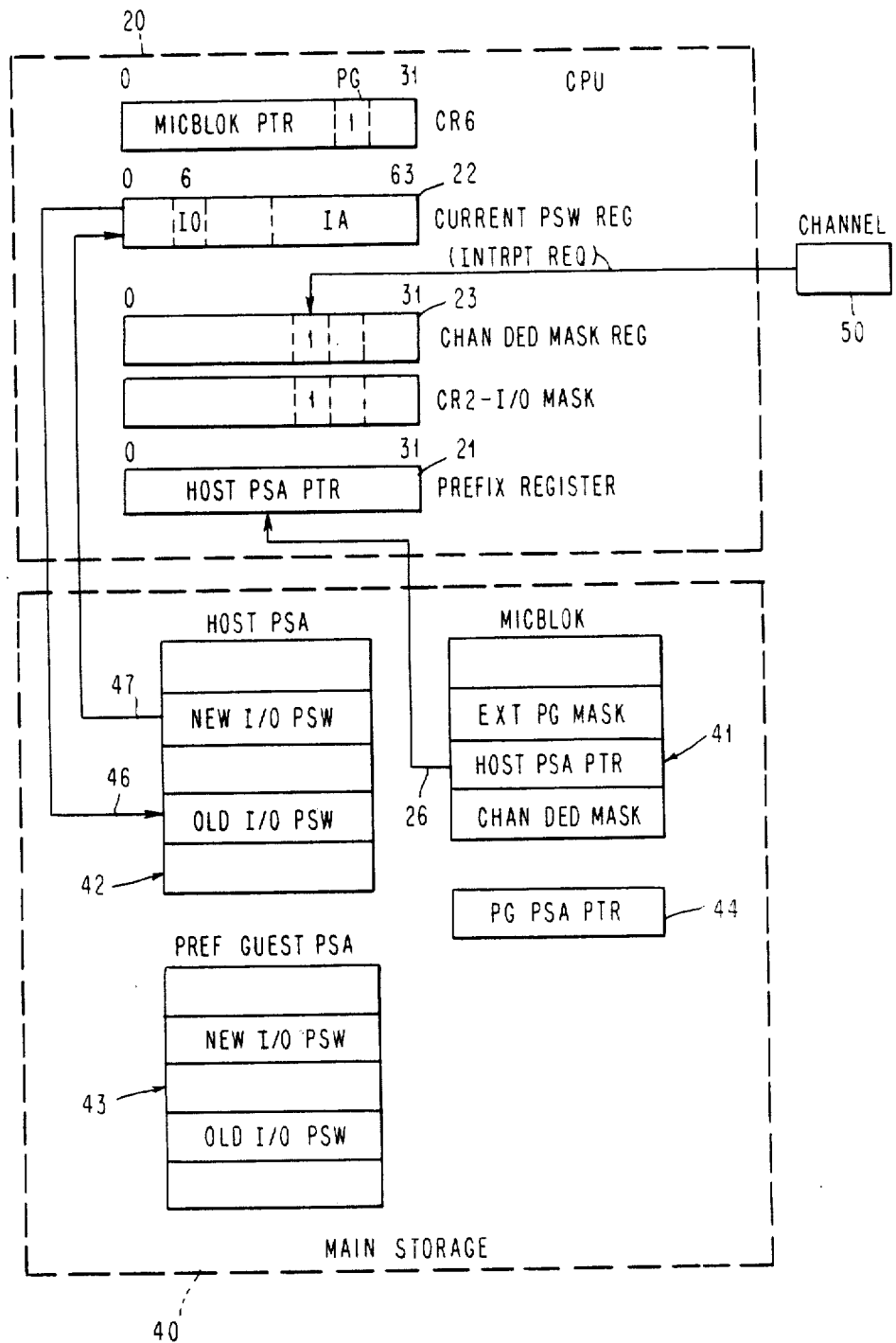
FIG. 2 is an operational diagram representing the special case of I/O interrupt by a channel not dedicated to a guest SCP while the guest SCP is controlling the CPU, which requires a CPU control switch.
Figure 3:
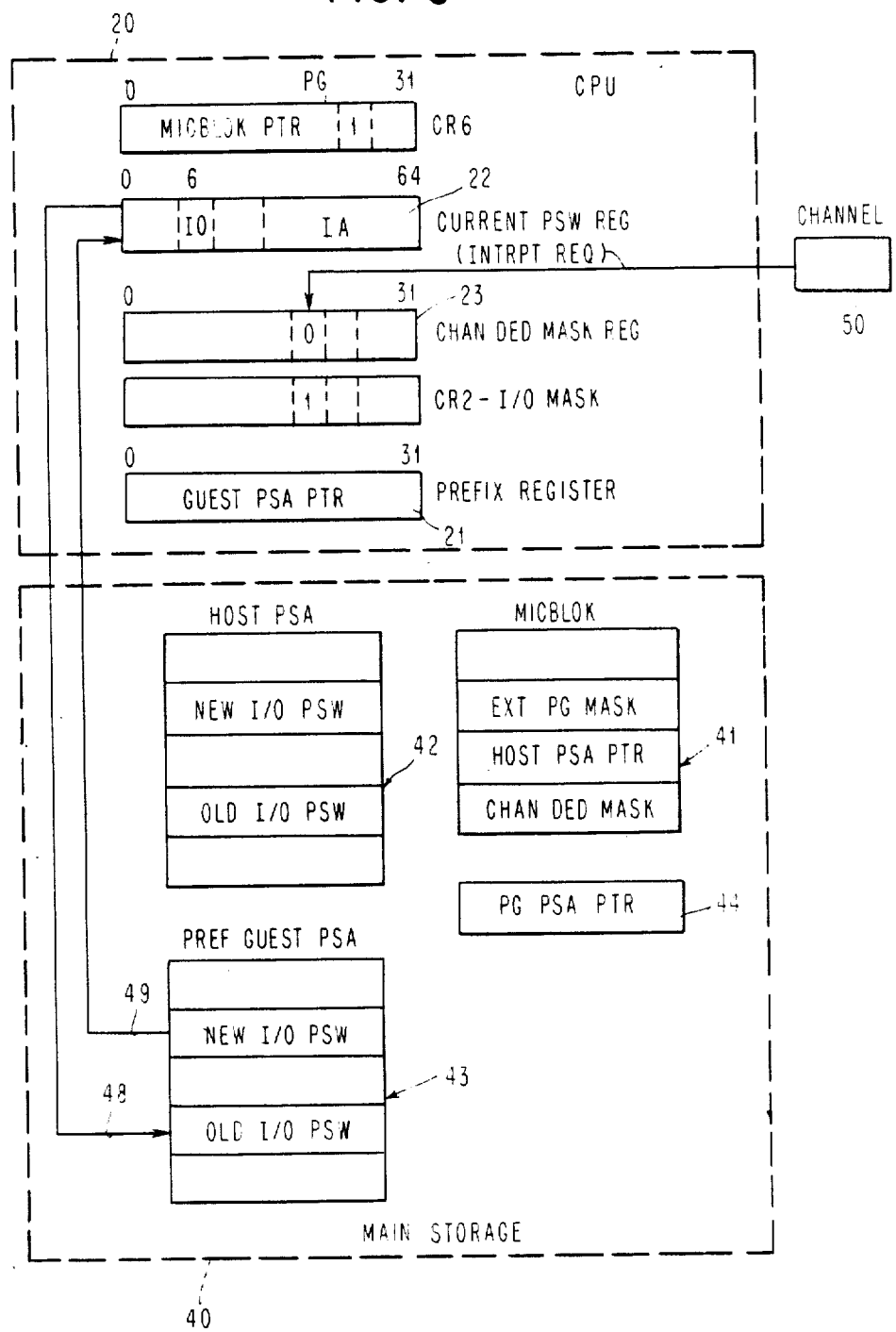
FIG. 3 is an operational diagram representing the special case of an I/O interrupt by a channel dedicated to a guest SCP while the guest SCP is controlling the CPU, which does not require a CPU control switch.

FIGS. 1, 2 and 3 represent examples of the operation of the preferred embodiment for three different operating situations in a CPU having I/O channel interrupts as the special event for rapidly and efficiently changing the control of the CPU from the guest MVS/370 SCP to the host VM/370 SCP. FIGS. 1, 2 and 3 each show the same pertinent hardware structure in a CPU 20 and a main storage 40 for three different situations to illustrate the differences in CPU SCP status for the three situations. The CPU contains a prefix register 21, the current S/370 PSW (program status word) hardware 22, and the S/370 control registers (CRs) of which the CRs pertinent to this invention are CR0, CR2 and CR6. The current PSW register 22 contains an I/O interrupt mask bit position, and an instruction address (IA) which normally is the address of the next instruction to be executed by the CPU.

CR6 contains an absolute address (called MICBLOK PTR) of a control block, MICBLOK 41, in main storage 40. MICBLOK 41 contains a field "host PSA pointer" having the absolute address of the host PSA 42. Another block 44 contains a field "PG PSA PTR" which is the absolute address of the preferred guest PSA 43. The predetermined fields in MICBLOK 41 are located in main storage at predetermined indices relative to the MICBLOK PTR address in CR6. In this manner, the CPU knows the locations in main storage of both the guest PSA and the host PSA.

CR2 in CPU 20 is conventional in S/370 and has its bit positions 0-31 respectively correspond to the system I/O channels, and they are channel mask bits set to a one state to indicate the CPU is interruptable by that channel, or to a zero state to indicate that the CPU is not interruptable by that channel.

A novel channel dedication mask register 23 has each bit position set to a zero state to indicate the corresponding channel is dedicated to the preferred guest MVS/370 SCP, and is set to a one state to indicate the corresponding channel is not dedicated to the guest SCP. The bit positions 0-31 in register 23 correspond to the same channels as the respective bit positions 0-31 in CR2.

Thus, any channel interrupt can be temporarily delayed in the conventional manner by setting its respective CR2 mask bit to a zero state and setting it back to a one state to enable the I/O interrupt when the CPU is willing to accept that channel interrupt.

However, the bit positions 0-31 in the channel dedication mask register 23 determine whether the guest SCP is permitted to handle an interrupt from any channel in the system when the guest SCP is in control of the CPU. If the corresponding dedication bit is zero, the guest MVS/370 SCP will handle the interrupt. But, if the dedication bit is one, the host VM/370 SCP will handle the interrupt.

Since register 23 controls channel dedication and not device or control unit dedication, it is necessary that the user only connect preferred guest dedicated devices and control units to dedicated channels.

I/O interrupts are asynchronous with CPU program execution. Thus, either the guest or host SCP may be controlling the CPU when an I/O interrupt is received, and at that time the corresponding channel dedication mask bit is examined to determine if the I/O interrupt is to be handled by the guest or host SCP. Whether a CPU control switch is needed to the other SCP is dependent on whether the guest SCP is currently controlling the CPU. If the host SCP is then controlling the CPU, the host SCP may handle the I/O interrupt because the host SCP is programmed to handle I/O interrupts from all channels, whether or not they are dedicated to the guest. However, when the host SCP is controlling the CPU, it is often disabled for handling I/O interruption requests from guest dedicated channels; and when control is soon returned to the guest SCP, it can then handle the interrupt request.

Bit 30 in CR6 is called the preferred guest (PG) bit position and its state indicates whether the host or preferred guest SCP is currently controlling the CPU. The PG bit is set to one when the guest SCP is controlling the CPU, and it is set to zero when the host SCP is controlling the CPU.

FIG. 1 illustrates a first example of an I/O interrupt being provided from a device connected to a channel not dedicated to the preferred guest SCP while the host SCP is controlling the CPU, i.e. while the host PSA pointer is in the prefix register 21. In this case, any I/O interrupt will be handled by the host SCP, since it now controls the CPU, regardless of whether the interrupt is from the illustrated dedicated channel. Hence, a zero state is provided for the channel dedication mask bit in register 23 for this channel. Therefore, no CPU control switch occurs and the dedicated-channel interrupt uses the host PSA 42 by storing 46 the CPU's current PSW into its old I/O PSW field, and by then fetching 47 its new I/O PSW field which then becomes the current PSW, thereafter controlling the CPU by addressing the host VM/370 interrupt handler program in order to service the I/O interrupt in the conventional manner.

FIG. 2 illustrates a second example in which the guest PSA pointer is in prefix register 21 when an I/O interrupt from a non-dedicated channel occurs. In this case, the channel dedication mask bit is one in register 23 (indicating a non-dedicated channel) which causes a CPU control switch by fetching 26 the host PSA pointer field in MICBLOK 41 and loading it into prefix register 21 to put the host VM SCP in control of the CPU. Then the I/O interrupt occurs and uses the host PSA.

FIG. 3 illustrates a third example in which the guest PSA pointer is in prefix-register 21 when an I/O interrupt is provided from a channel dedicated to the MVS guest (i.e. the channel dedication bit in register 23 is set to zero for this channel). In this case, there is no CPU control switch and the MVS SCP now handles the interrupt by storing 48 the current PSW into the old I/O PSW and fetching 49 the new I/O PSW from the guest PSA 43.

Figure 4:
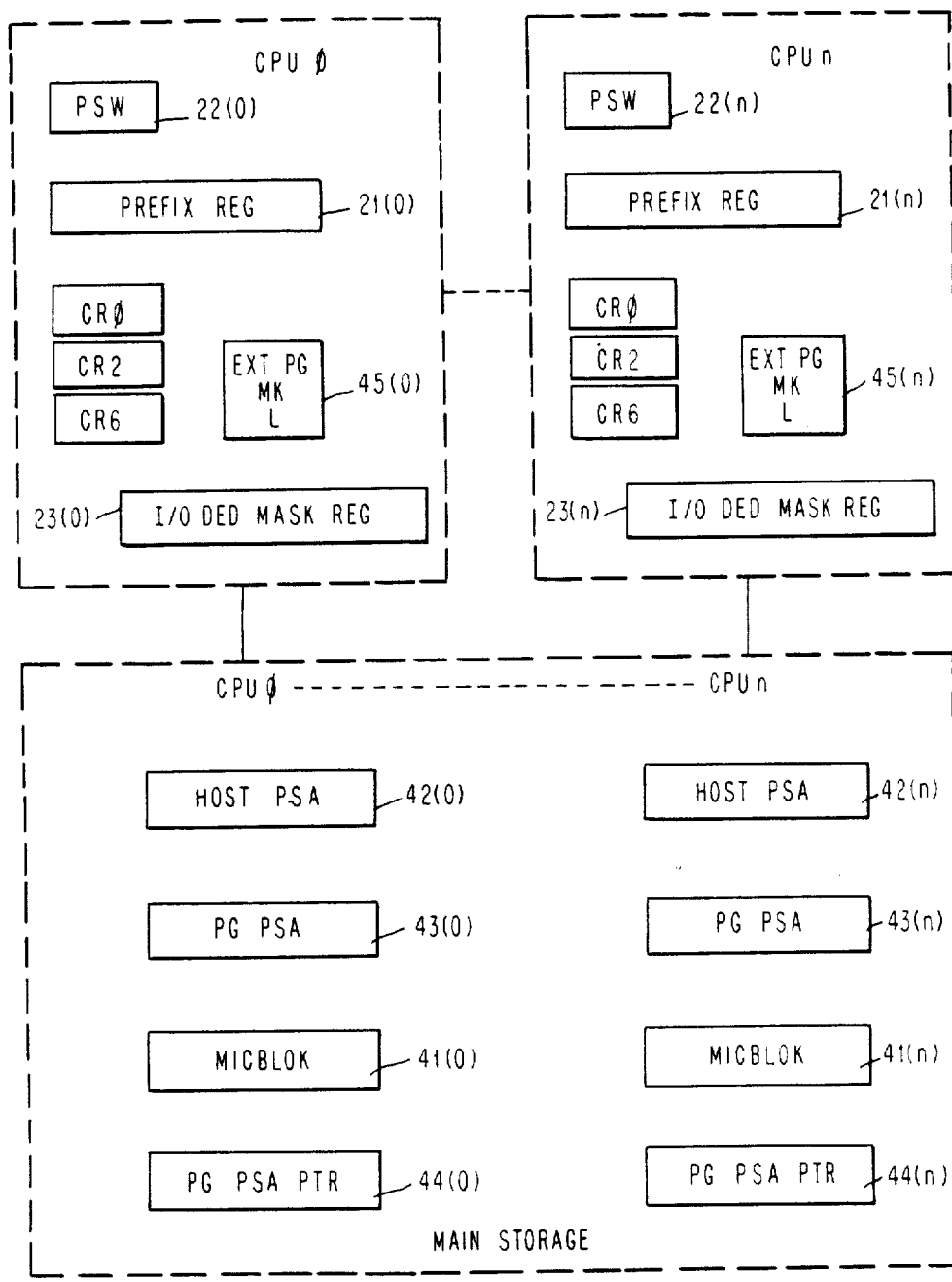
FIG. 4 represents a multiprocessing (MP) system which contains the subject invention.

The invention may be used in a UP as represented in FIGS. 1–3 or in an MP as represented in FIG. 4.

In FIG. 4, the MP contains n+1 of CPUs labeled from CPU0 to CPUn, in which each CPU contains the items shown in CPU 20 in FIG. 1. In the MP shared main storage in FIG. 4, each CPU in the MP has a respective set of the items 41, 42, 43 and 44 which are the same as shown in main storage 40 in FIG. 1, i.e. host PSA 40, preferred guest PSA 43, MICBLOK 41 and preferred guest PSA pointer 44. As previously mentioned, the main storage absolute address map shown in FIG. 9 can accommodate a UP or MP according to the number of host and guest PSAs provided in main storage. In a MP, it is not essential that all CPU's support the preferred guest, and in such case any CPU not supporting the preferred guest will only have the host PSA provided for it in main storage. Thus in FIG. 9, there are n+1 host PSA(H)s and k+1 guest PSA(G)s.

Figure 5:
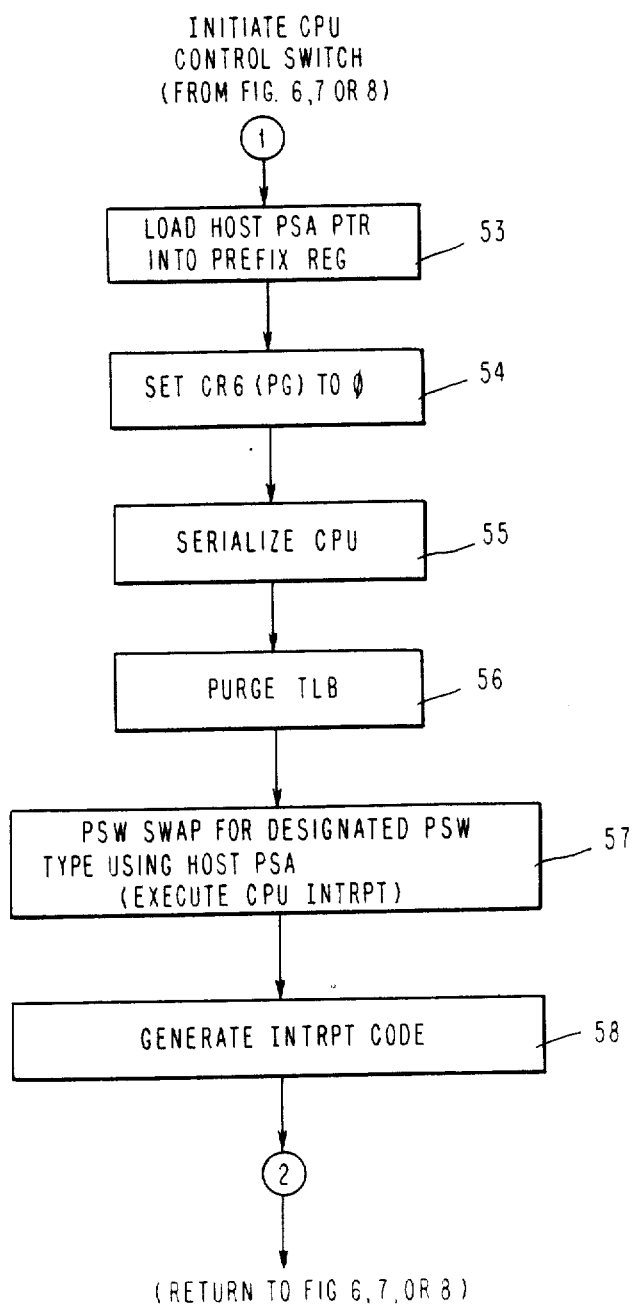
FIG. 5 represents a microcode CPU control switch method for switching CPU control from a guest SCP to a host SCP.

FIG. 5 is a flow diagram of the novel microcode (i.e. firmware) method in this invention for performing a CPU control switch in a designated CPU from guest SCP control to host SCP control. The CPU control switch executed in FIG. 5 is initiated in a novel manner by hardware or microcode shown in FIGS. 6, 7, or 8 which determines when a CPU control switch should occur, and selects the type of interrupt to be executed by the CPU control switch.

In FIG. 5, the host PSA pointer is loaded into the prefix register. Then the other steps 54–58 prepare the CPU for executing the host SCP. That is, step 53 fetches the field "host PSA pointer" in MICBLOK 41 in main storage and loads it into prefix register 21 to address the host PSA 42. However, the CPU is not yet prepared to begin execution of the host SCP until other steps in FIG. 5 are executed by the microcode.

Step 54 sets the PG bit position 30 in CR6 to zero state to indicate the host SCP is in control of the CPU.

The microcode boxes 55–59 shown in FIG. 5 perform types of steps which are currently designed into all large IBM S/370 CPUs, e.g. 3033 or 3081. The novelty in the method of FIG. 5 is the address accessed by step 53 and in the disclosed combination of steps to provide the stated result, which is to execute a microcode switching of CPU control from the guest SCP to the host SCP by changing the PSA pointer in the prefix register 21 from the guest PSA pointer to the host PSA pointer in the manner discussed in the example in FIG. 2.

Step 55 serializes the CPU in the manner defined in the existing IBM S/370 Principles of Operation, which involves completing all outstanding requests to main storage before the host SCP can begin execution of the next program instruction by the CPU. Step 56 purges the TLB (i.e. CPU DLAT) by setting its valid bits to invalid state in all TLB entries.

Figure 6:
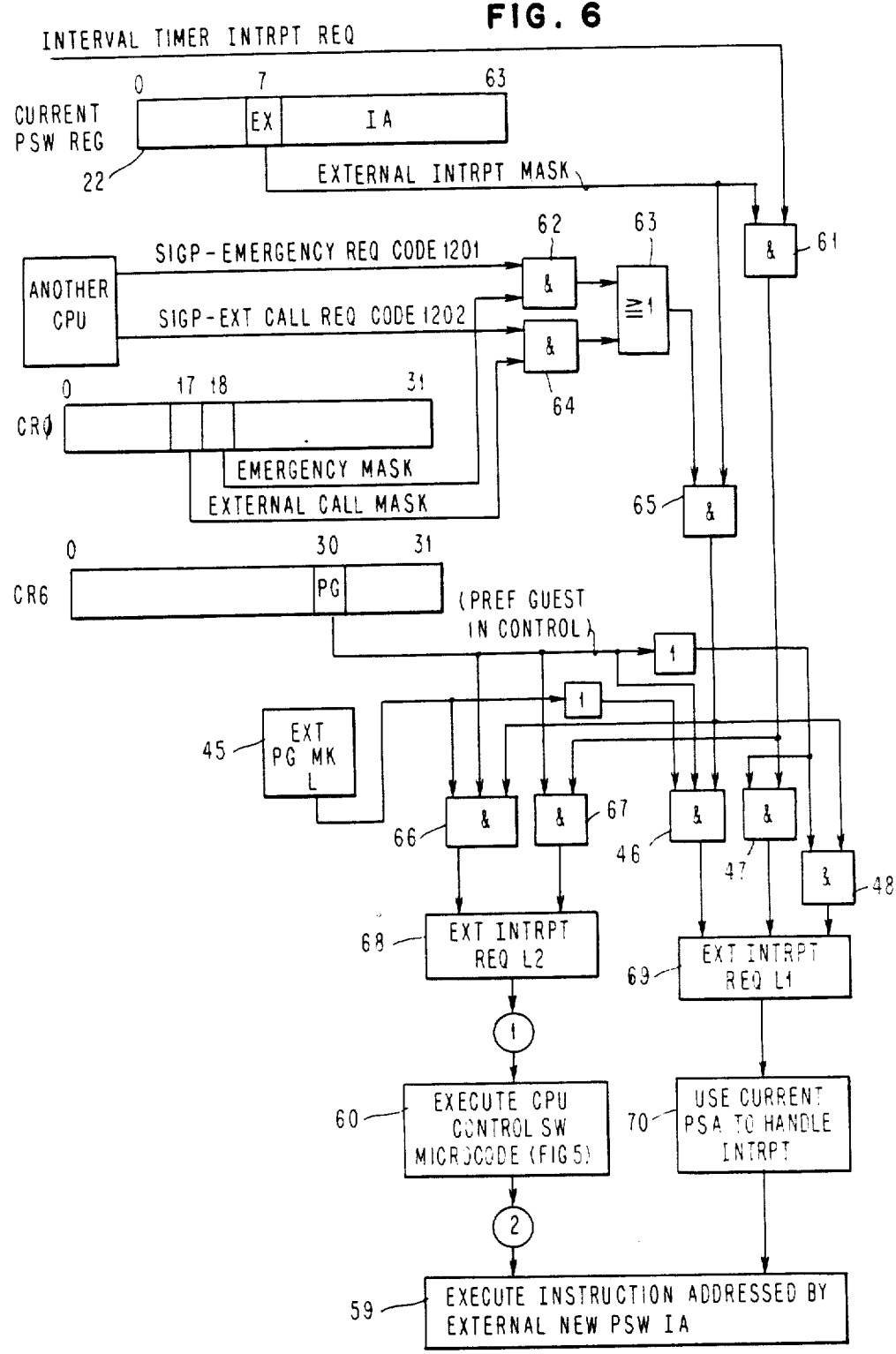
FIG. 6 is a logic diagram of external and timer interruption initiation of CPU control switching.
Figure 7:
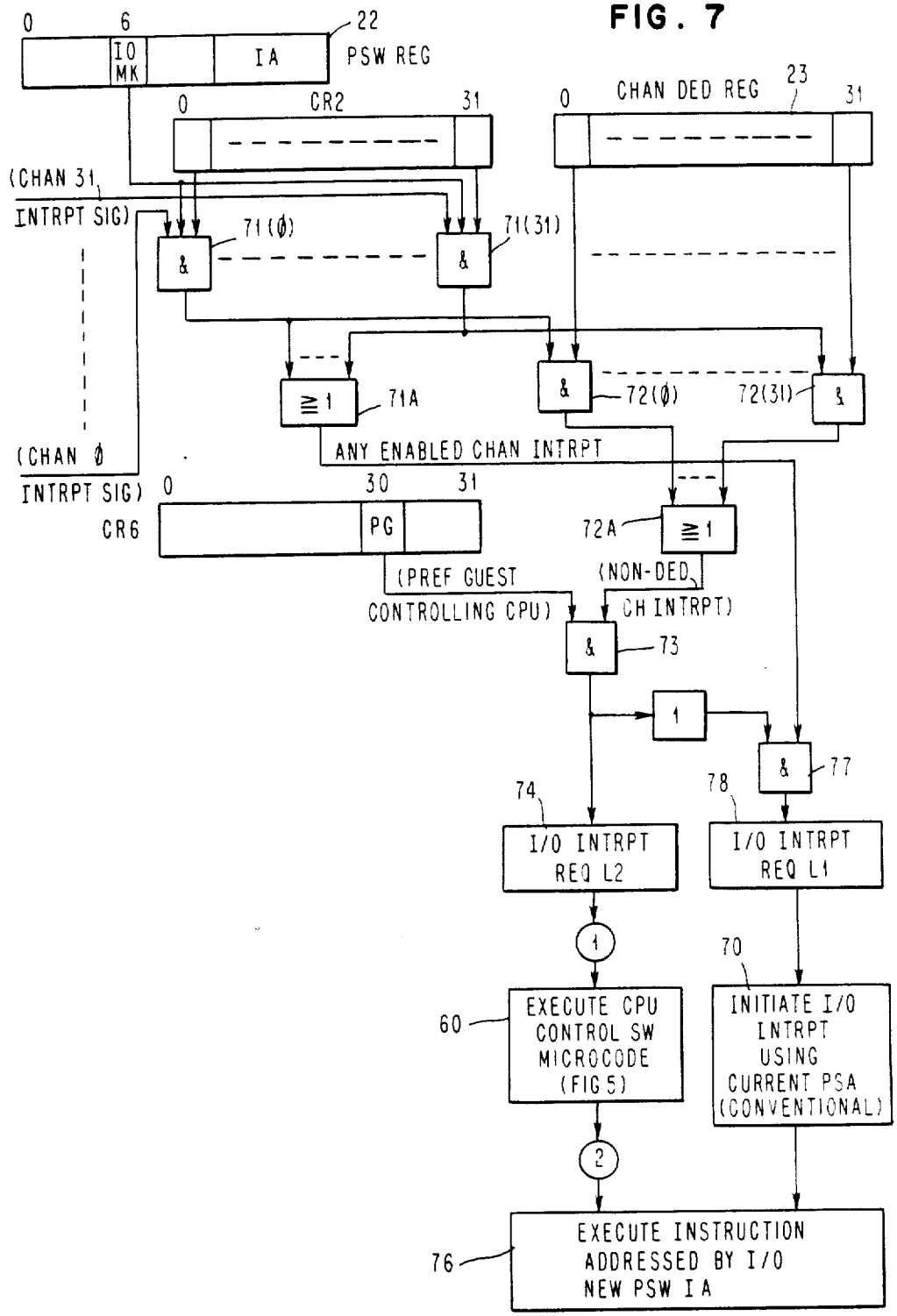
FIG. 7 is a logic diagram of I/O channel interruption initiation of CPU control switching.
Figure 8:
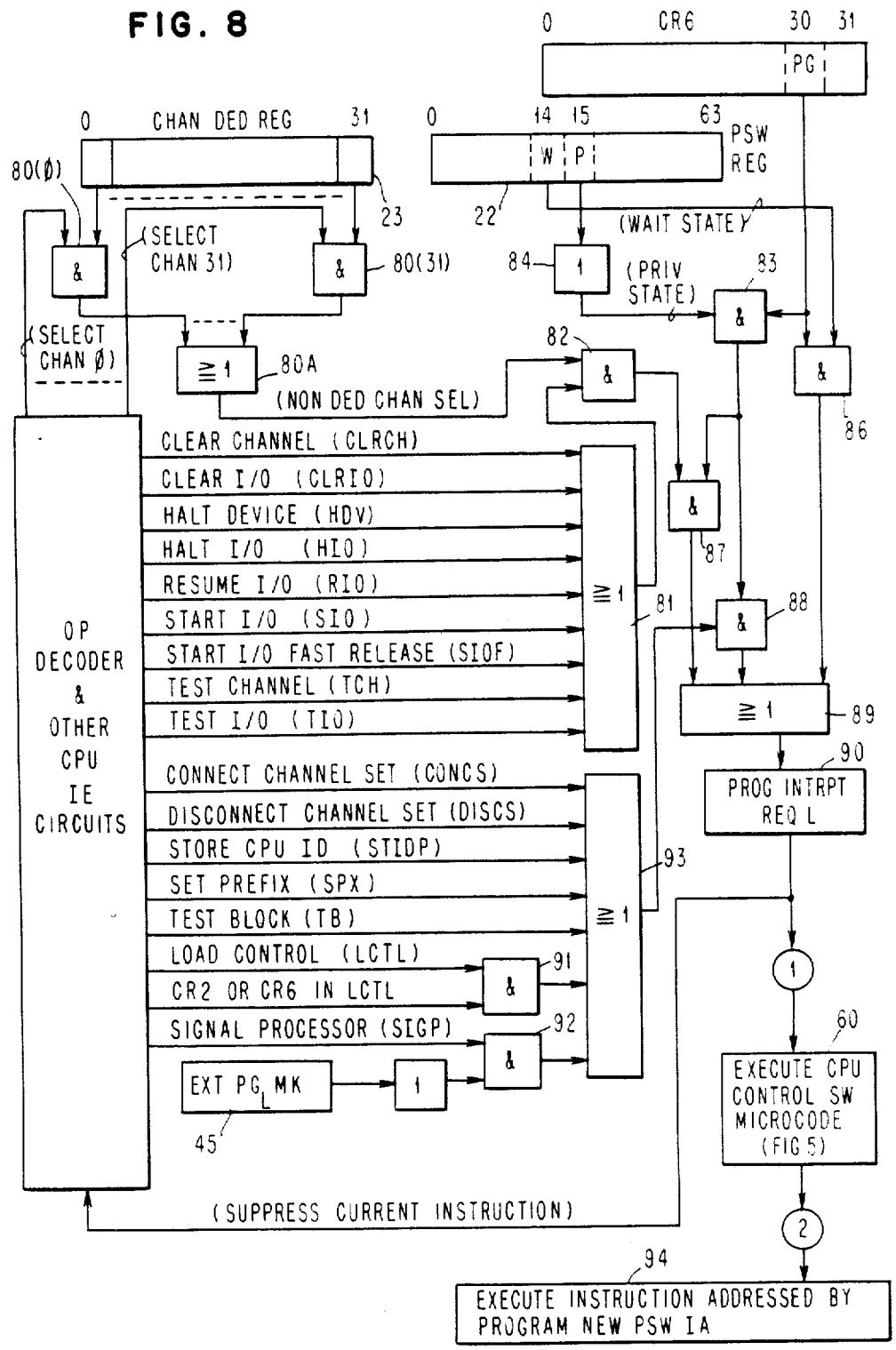
FIG. 8 is a logic diagram of guest wait state initiation and special system-control instruction initiation of CPU control switching.

Step 57 comprises the conventional execution of a CPU interrupt using the host PSA for the type of interrupt requested by the CPU control switch initiation controls in FIGS. 6, 7 or 8. Thus, a CPU control switch may be initiated by one of the following: (1) a channel interrupt request from FIG. 7 causing an I/O PSW swap, (2) a special guest instruction or guest wait state from FIG. 8 causing a program PSW swap, or (3) a timer interrupt or an external event from FIG. 6 causing an external PSW swap. The PSW swap for the designated interrupt is completed in the conventional manner to provide an instruction address (IA) in the CPU's current PSW that will now select the next SCP program routine.

Step 58 generates an interrupt code identifying the particular type of interrupt executed in step 57, and the code may indicate the cause of the interrupt. Step 58 also puts the generated interrupt code into the current PSA to provide a hardware-to-software interface identifying the last executed interrupt to the called SCP which is about to begin execution.

Thus, when the control switch microcode sequence in FIG. 5 ends at exit 2, the called SCP routine starts execution on the CPU.

When the initial program loading (IPL) occurs for a CPU which is to operate with both a host VM/370 SCP and a preferred guest MVS/370 SCP, main storage areas are assigned for that CPU's items 42, 43, 41 and 44, the fields in MICBLOK 41 are inserted, that CPU's CR6 is loaded with the MICBLOK pointer and its PG bit position 30 is set to zero state to indicate the host is initially in control of the CPU. The MICBLOK 41 is accessed and its host PSA pointer field is loaded into prefix register 21, its channel dedication mask field is loaded into the channel dedication register 23, and its external preferred guest mask field is accessed and a bit is set into an external PG mask latch 45 in that CPU (one state indicates the guest SCP wil not handle interrupts from any other CPU) and specific external mask bits are set into control register 0 bit positions 17 and 18 (see FIG. 6) to control the guest SCP handling of specified external interrupts when the external mask in latch 45 is set to a zero state generally enabling the guest SCP to handle external interrupts. The states of the mask bits in the current PSW register 22 and in the control registers control the CPU operation regardless of whether the host SCP or guest SCP is controlling the CPU.

The novel control switch initiation controls in FIGS. 6, 7 and 8 are now discussed in detail. The guest-to-host microcode control switch in FIG. 5 has reference number 60 in FIGS. 6, 7 and 8.

FIG. 6 shows hardware interval timer and external interrupt initiation controls for determining whether or not a CPU control switch is to be initiated. An external interrupt request signal is provided by a signal processor (SIGP) instruction executed in another CPU, and the interval timer interrupt request signal originates in the conventional manner within the local CPU.

The ability of the local CPU to be interrupted by either an external interrupt or a local timer interrupt is controlled by the state of bit position 7 in its current PSW register 22, which is set to a one state when external interrupts are enabled, and to a zero state when they are disabled and therefore cannot interrupt the CPU regardless of whether the host SCP or guest SCP is in control. When the general external mask of PSW bit position 7 is enabled, the states of the specific external mask bit positions 17 and 18 in CR0 enable or disable the SIGP external call and emergency signals, respectively. These mask bits disable when in zero state and enable in a one state.

Also in FIG. 6, a guest/host mask bit exists in an external preferred guest mask (EXT PG MK) latch 45, which controls whether the guest SCP can handle external interrupts. Latch 45 is set when CR6 is loaded (e.g. the CRs are normally loaded when a guest is dispatched) to the state of bit 22 in the external PG mask field in MICBLOK 41 in FIG. 1 to control whether the preferred guest is permitted to handle external interrupts. Latch 45 is set to zero state when the preferred guest is enabled to handle external interrupts from another CPU.

However, timer interrupts can only be handled by the host SCP. If a timer interrupt request signal occurs during CPU control by the guest SCP, a CPU control switch results, so that the host SCP will handle the timer interrupt.

In FIG. 6, AND gate 61 receives both the interval timer interrupt request signal and the external interrupt mask signal from bit position 7 in PSW register 22 (which is on when interval timer interrupts and external interrupts are enabled). If the host SCP is in control of the CPU (i.e. PG bit is zero in CR6), the inverted PG bit then enables an AND gate 47 to pass an enabled timer interrupt signal from gate 61 to set a first external interrupt request latch 69, which initiates a conventional CPU external interrupt using the host PSA (currently indicated by the PG bit to be in control of the CPU).

If instead the preferred guest is in control (i.e. PG bit is one) when an enabled timer interrupt signal is provided from gate 61, a CPU control switch results due to enablement of a gate 67 by the PG bit state; and then gate 47 is disabled by the PG bit's inverted state. The output of gate 67 then sets a second external interrupt request latch 68 which initiates the CPU control switch 60 (explained in relation to FIG. 5).

Whenever another CPU provides a SIGP signal to the local CPU (such as an emergency request signal or an external call request signal), it is respectively received by an AND gate 62 or 64 which is controlled by CR0 mask bit position 18 or 17, respectively. An OR circuit 63 passes the output from either gate 62 or 64 to an input of an AND gate 65. Another input of AND gate 65 is conditioned by the state of the general external interrupt mask bit position 7 in the PSW register 22. Thus, if the general external mask is enabled (PSW bit 7 is one), the SIGP signal is provided from gate 65 to respective inputs of AND gates 46, 48 and 66. AND gate 66 determines if the preferred guest will not be permitted to handle the external interrupt. Other inputs to gate 66 are the output of the PG bit position in CR6 (PG bit is one when the preferred guest is controlling the CPU), and the output of latch 45 (set on when the preferred guest is not enabled to handle external interrupts). When activated, AND gate 66 sets the second external interrupt request latch 68 to initiate the CPU control switch 60 to switch the CPU control to the host SCP.

However, if the preferred guest is in control of the CPU (PG bit is set to one in CR6) when the preferred guest is enabled for external interrupts by latch 45 being set off when an enabled emergency signal or external call signal is provided from gate 65, gate 66 is disabled by the output of latch 45, and there will not be a CPU control switch so that the CPU control remains with the preferred guest SCP to handle the interrupt. Then AND gate 46 is activated by the inverted output of latch 45, and the output of the PG bit to pass the external interrupt signal from gate 65 to the first external interrupt request latch 69 to initiate a CPU interrupt using the current guest PSA.

Upon completion of an external or timer interrupt, box 59 indicates the conventional operation of the CPU as it begins execution after the interrupt with the instruction addressed by the IA in the current PSW, which is derived from the external new PSW in whichever PSA this invention provided for fetching that PSW.

FIG. 7 shows the CPU control switch initiation controls for responding to I/O channel interrupts. Thirty-two AND gates 71(0) through 71(31), respectively, receive the interrupt signal outputs of up to 31 respective channels and the outputs of corresponding bit positions in the I/O mask register CR2. Also each AND gate 71(0)–71(31) has an input connected to the I/O mask bit position 6 in PSW register 22. Then any of AND gates 71(0)–71(31) will provide an output through an OR circuit 71A whenever any enabled channel provides an interrupt signal.

Likewise thirty-two AND gates 72(0) through 72(31) respectively receive the outputs of the AND gates 71(0) through 71(31) and the corresponding thirty-two outputs of the bit positions in the channel dedication register 23. Thus, any of the gates 72(0)–72(31) will provide an output through an OR circuit 72A when an interrupt signal is provided by a channel not dedicated to the guest SCP.

An AND gate 73 is activated when it receives the non-dedicated channel output of OR circuit 72A, and a one output state from the PG bit in CR6 indicating the preferred guest is in control. Activation of AND gate 73 sets a second I/O interrupt request latch 74 to initiate a CPU control switch 60 for an I/O interrupt which will be done using the host PSA. When the control switch is completed, box 76 indicates the conventional operation of the CPU when it begins execution after the CPU interrupt with the instruction address in the I/O new PSW.

AND gate 73 is not activated when an interrupt is received from a dedicated channel, because OR circuit 72A does not pass an interrupt signal from a channel dedicated to the preferred guest SCP. The lack of a signal from gate 72A inhibits gate 73 regardless of whether the preferred guest or host is currently controlling the CPU, i.e. regardless of the state of PG bit 30 in CR6. Then the disabled output of gate 73 activates an inverter to activate an AND gate 77, which then passes the enabled channel interrupt signal from OR circuit 71A to set a first I/O interrupt request latch 78, which then initiates a conventional I/O interrupt 70 that will then use the current PSA, whether it be the host or guest PSA (i.e. regardless of the setting of the PB bit) to handle the dedicated channel interrupt.

FIG. 8 illustrates the CPU control switch initiation circuits for a special set of privileged instructions, or CPU wait state by the preferred guest, either of which can cause a CPU control switch. These special instructions include the I/O instructions and system control instructions. Initiation of execution of any of these instructions by the CPU IE unit is signalled on special lines connected to the OP decoder circuits in the local CPU. The lines signalling execution of the I/O instructions are connected to an OR circuit 81. The lines signalling the pertinent execution of the system control instructions are connected to an OR circuit 93. An AND gate 91 outputs a load control (LCTL) instruction signal only when control register 2 or 6 (used by this invention) is to be loaded, and an AND gate 92 outputs a signal processor (SIGP) instruction signal only when latch 45 is set on to indicate the guest SCP may handle external interrupts.

The channel dedication mask in register 23 is also used in the determination of whether a CPU control switch is to be initiated for an I/O instruction being executed by the CPU. Thus, a respective AND gate 80(0) through 80(31) receives the state of a respective channel dedication bit position outputted from register 23, and a corresponding select channel line from the CPU which is activated when the corresponding channel is selected by an I/O instruction. An OR circuit 80A receives the outputs of gates 80(0)–80(31) and provides an output to an AND gate 82 to signal when the selected channel is not dedicated to the preferred guest.

An AND gate 87 receives the output of gate 82, and also receives the output of an AND gate 83 which is activated by a CPU privileged state indicated by PSW bit 15 having zero state and the PG bit in CR6 having a one state to indicate the preferred guest is in control of CPU. Thus, AND gate 87 indicates when the guest is controlling the CPU which is in privileged state when it begins executing an I/O instruction for a non-dedicated channel. In this case, the guest is not permitted to execute the I/O instruction, and a CPU control switch is performed. This is caused by the output of AND gate 87 which passes through an OR circuit 89 to set a program interrupt request latch 90 which then initiates a CPU control switch to the host SCP.

Whenever any of the non-I/O special instructions in FIG. 8 provides an output from OR circuit 93 while the guest is controlling the CPU, a control switch is initiated. This is done by an AND circuit 88 which has inputs which receive the output of OR circuit 93, and the output from AND circuit 83 which is activated by the CPU privileged state while the preferred guest is in control. Activation of AND gate 88 provides an output to OR circuit 89 which sets latch 90 to cause a CPU control switch 60.

Also, a CPU control switch is initiated whenever the CPU goes into wait state while the guest is in control. The CPU wait state is indicated by a wait state bit in the PSW register 22 at bit position 14 which is set to one state whenever the CPU is put into a wait state. An AND circuit 86 receives a wait state output from PSW bit 14 and also receives the state of PG bit position 30 from CR6. Thus, gate 86 is activated whenever a wait state occurs while the preferred guest is controlling the CPU to provide a signal to OR circuit 89 that sets program interrupt latch 90 to initiate a CPU control switch 60.

In FIG. 8, whenever a system control instruction initiates a CPU control switch, that instruction has its execution suppressed by the CPU, and it is not then executed. After the CPU control switch when the host SCP is dispatched, a host routine may contain an instruction performing the function of the suppressed instruction.

When the CPU control switch microcode 60 (in FIG. 5) is completed, box 94 in FIG. 8 represents the beginning of CPU execution after the program interrupt with the instruction address in the program new PSW to continue CPU operation with a host routine.

Although this invention has been shown and described with respect to plural embodiments thereof, it should be understood by those skilled in the art that various changes and omissions in the form and details of the invention may be made therein without departing from the spirit and the scope of the invention.

Having thus described our invention, what we claim as new and desire to secure by Letters Patent is:

1. A method of switching the control of a CPU in a MP or UP data processing system among a plurality of system control programs (SCPs), a next instruction to be executed by the CPU a particular SCP of the plural SCPs to control the CPU being located by an instruction address in PSW (program status word) means in the CPU, each SCP requiring a hardware-to-software interface area (PSA) in a main storage of the system for storing old PSW values and obtaining new PSW values for the PSW means, comprising the CPU controlled steps of:
- sensing an event occurring in, or signalled to, the CPU that selects a preset state in the CPU,
- identifying which SCP is currently controlling the CPU to indicate the currently controlling SCP,
- determining from the selected preset state in the CPU and respond to the event sensed by the sensing step, the particular SCP not required to be a SCP that operated the CPU immediately prior to the currently controlling SCP,
- loading a prefix register by hardware/microcode means in the CPU with a prefix value fetched from main storage for locating the PSA of a particular SCP determined by the determining step to be the next SCP to control the CPU when the identifying step indicates the particular SCP is not in control of the CPU,
- interrupting the CPU operation after the loading step is executed by storing a value in the PSW means into, and by loading the PSW means with a new PSW value from, fields associated with the sensed event in the PSA located by the address in the prefix register,
- whereby the loading step executes a CPU control switch for changing the control of the CPU from the currently controlling SCP to the particular SCP which is to control the CPU for responding to the event.

2. A CPU control switching method as defined in claim 1 in which the sensed event is an external signal from another CPU to a local CPU, the sensing step in the local CPU further comprising:
- detecting the preset state from a SCP-enabling mask field for selecting the particular SCP for responding to the interruption requested by the event, one state of the SCP-enabling mask field enabling the selection of the currently controlling SCP to handle the CPU interruption, and the other state of the SCP-enabling mask field enabling the selection of the particular SCP to handle the CPU interruption,
- whereby the currently controlling SCP is not to handle the CPU interruption when the other state exists in the SCP-enabling mask field so that a CPU control switch can be done by the loading step to put the particular SCP in control of the CPU before the interruption is responded to by the CPU.

3. A CPU control switching method as defined in claim 1 in which the sensed event is an I/O instruction, the CPU-controlled sensing step further comprising:
- detecting a state of a field in a dedication mask entry, the field corresponding to a set of I/O devices connected to the CPU, one state of the field indicating the set of I/O devices is dedicated to the currently controlling SCP, and another state of the field indicating the set of I/O devices is dedicated to the particular SCP,
- whereby the currently controlling SCP may be selected to control the CPU when an I/O instruction is to be executed by the CPU, so that a CPU control switch by the loading step can be avoided for a set of I/O devices dedicated to the currently controlling SCP, although the CPU control switch must be executed for a set of I/O devices dedicated to the particular SCP.

4. A CPU control switching method as defined in claim 1 in which the sensed event is an I/O interruption for which the CPU is enabled, the CPU-controlled sensing step further comprising:
- detecting by hardware/mirocode means a state of a field in a dedication mask entry within the CPU, the field corresponding to a set of I/O devices connected to the CPU, one state of the field indicating the set of I/O devices is dedicated to the currently controlling SCP, and the other state of the field indicating the set of I/O devices is dedicated to the particular SCP,
- whereby the currently controlling SCP may be selected to control the CPU when an I/O interruption is to be taken by the CPU, so that a CPU control switch by the loading step can be avoided for a set of I/O devices dedicated to the currently controlling SCP, although the CPU control switch must be executed for a set of I/O devices dedicated to the particular SCP.

5. A CPU control switching method as defined in claim 1, further comprising:
- setting a SCP indicating field in a control register to indicate the particular SCP as being in control of the CPU after the loading step loads the prefix register,
- whereby the identifying step uses the SCP indicating field to determine which SCP is currently controlling the CPU.

6. A CPU control switching method as defined in claim 1, in which the loading step further comprises:
- providing a control register in the CPU with a main storage address of a control block containing a particular PSA pointer for the particular SCP not currently controlling the CPU,
- fetching the particular PSA pointer using the address in the control register when the identifying step identifies the particular SCP to handle a CPU interruption when the particular SCP is not controlling the CPU, and
- storing the particular PSA pointer obtained by the fetching step into the prefix register.

7. A CPU control switching method as defined in claim 6, further comrpising:
- initially fetching a channel dedication mask from an entry in the control block in main storage,
- initially loading the channel dedication mask into a channel dedication mask register in the CPU, dedication mask fields in the register corresponding to respective I/O channels, the state of each corresponding field position indicating whether the corresponding I/O channel is dedicated to the currently controlling SCP or to another SCP,
- receiving an I/O interrupt signal from an I/O channel while the CPU is enabled for I/O interruption,
- detecting the state of the field in the channel dedication mask register corresponding to the I/O channel sending the I/O interrupt signal to determine whether or not the I/O channel is dedicated to the currently controlling SCP,
- the loading step being executed if the identifying step determines the I/O channel is not dedicated to the currently controlling SCP,
- whereby the loading step is not executed when the identifying step and the detecting step indicate that the I/O channel is dedicated to the currently controlling SCP which should handle the I/O interrupt from the dedicated I/O channel without a CPU control switch.

8. A CPU control switching method as defined in claim 1, further comprising:

serializing the CPU by completing all main storage accesses previously requested by the CPU while being controlled by the currently controlling CPU when the determining step determines the CPU should be switched to the particular SCP, purging any translation lookaside buffer (TLB) in the CPU by invalidating all entries in the TLB, interrupting the CPU operation, when the loading step is executed, by storing the PSW value in the PSW means into, and by loading the PSW means with a new PSW value from, respective old and new PSW fields associated with the sensed event in the PSA located by the address in the prefix register after being loaded by the loading step, generating an interrupt code and loading the interrupt code into an interruption code field in the PSA located by the prefix register.

9. A CPU control switching method as defined in claim 1, in which the particular SCP is a host SCP for the data processing system and the currently controlling SCP is a guest SCP in the system, and the prefix value for the host is stored in a predefined control block in main storage.

10. A CPU control switching method as defined in claim 1, further comprising:

the sensing step indicating the event is an interval timer interrupt signal which is enabled in the CPU, the determining step detecting the state of the SCP identification field and not initiating the loading step if the currently controlling SCP is to control the CPU, interrupting the CPU with an external interrupt by using the PSA of the SCP being addressed by the existing value in the prefix register to handle the interval timer interrupt signal.

11. A CPU control switch method as defined in claim 1, further comprising:

the sensing step indicating the event is an external interrupt signal from another CPU which is enabled in the CPU receiving the interrupt signal, the determining step detecting the state of a given SCP enabling mask field and initiating the loading step if the mask field is detected to indicate the currently controlling SCP identified by the identifying step is not enabled to handle external interrupts, but the determining step not initiating the loading step if the mask field is detected to indicate the currently controlling SCP is enabled to handle external interrupts, interrupting the CPU with an external interrupt by using the PSA of whichever SCP is being addressed by the prefix register to handle the external interrupt signal.

12. A CPU control switch method as defined in claim 1, further comprising:

the sensing step indicating the event is an I/O interrupt signal from an I/O device when I/O interrupts are enabled in the CPU, the determining step detecting the state of an I/O device set dedication mask field and initiating the loading step if the mask field is detected to indicate the I/O device set is not dedicated to the currently controlling SCP identified by the identifying step, but the determining step not initiating the loading step if the mask field is detected to indicate the I/O device set is dedicated to the currently controlling SCP, interrupting the CPU with an I/O interrupt by using the PSA of whichever SCP is being addressed by the prefix register to handle the I/O interrupt signal.

13. A CPU control switch method as defined in claim 1, further comprising:

the sensing step indicating the event is a wait state in the CPU, the determining step initiating the loading step if the currently controlling SCP identified by the identifying step indicates the currently controlling SCP should not remain in control of the CPU, but the determining step not initiating the loading step if the identifying step indicates the particular SCP is controlling the CPU, interrupting the CPU with a program interrupt by using the PSA of whichever SCP is being addressed by the prefix register for initiating the particular SCP to dispatch work for the CPU.

14. A CPU control switching method as defined in claim 1, further comprising:

the sensing step indicating the event is the execution by the CPU of a special system-control instruction, the determining step initiating the loading step if the CPU is in supervisor state, but the determining step not initiating the loading step if either the CPU is in problem state or the identifying step indicates the particular SCP is in control of the CPU, suppressing the CPU execution of the special system control instruction and interrupting the CPU with a program interrupt if the loading step has been executed, whereby the PSA of the particular SCP is used in executing the program interrupt of the CPU, and whereby the particular SCP can thereafter determine whether to execute the function of the special system control instruction.

15. A CPU control switch method as defined in claim 1, further comprising:

the sensing step indicating the event is the execution by the CPU of an I/O control instruction and indicating the device selected for the I/O control instruction, the determining step detecting the state of an I/O device set dedication mask field associated with the selected device and initiating the loading step if the mask field is detected to indicate the I/O device set is not dedicated to the currently controlling SCP identified by the identifying step while the currently controlling SCP is in supervisor state, but the determining step not initiating the loading step if either the mask field indicates the device is dedicated to the currently controlling SCP or the CPU is in problem state, suppressing the execution of the I/O control instruction and interrupting the CPU with a program interrupt if the loading step has been executed, whereby the PSA of the particular SCP is used in executing the program interrupt of the CPU and whereby the particular SCP can thereafter determine whether to execute a replacement I/O control instruction.

16. Means for initiating the switching of control of a CPU in a MP or UP data processing system from a preferred guest SCP (system control program) to a host SCP, a next instruction to be executed by the CPU being located by an instruction address in PSW (program status word) means in the CPU, each SCP requiring a hardware-to-software interface area (PSA) in a main storage of the system for storing old PSW values and obtaining new PSW values for the PSW means; the CPU containing an interval timer means for generating timer interrupt signals, the PSW means containing bit positions for: an I/O mask, external mask, external call mask, emergency mask, CPU wait state, and CPU supervisor state, and a control register with I/O channel-enablement bit positions respectively corresponding to I/O channel numbers architected for the system, comprising:

- a preferred-guest-in control (PG) bit position in a control register in the CPU in which a first state indicates the preferred guest SCP is in control and a second state indicates the host SCP is in control of the CPU,
- a control block in programmable main storage containing a host prefix value,
- a PG mask latch in the CPU which is set to a first state when the preferred guest SCP is enabled to handle external interrupts and is set to a second state when the preferred guest is not enabled to handle external interrupts,
- first ANDing means for receiving a CPU enabled external interrupt signal from another CPU, the output of the PG mask latch, and the state of the PG bit position,
- whereby an output from the first ANDing means initiates CPU control switching from the guest SCP to the host SCP by loading the host prefix value from main storage into the prefix register.

17. CPU control switch initiation means as defined in claim 16, further comprising:
- second ANDing means for receiving a CPU enabled timer interrupt signal and the state of the PG bit position,
- whereby an output from the second ANDing means initiates CPU control switching from the guest SCP to the host SCP.

18. CPU control switch initation means as defined in claim 16, further comprising:
- channel dedication mask registering means including preferred guest channel dedication mask bit positions corresponding to I/O channel numbers architected for the system, a first state of any channel dedication mask bit position indicating the preferred guest SCP is enabled to handle I/O interrupt requests from the corresponding I/O channel and a second state of the bit position indicating the preferred guest SCP is not enabled to handle I/O interrupt requests from the corresponding I/O channel,
- third ANDing means for receiving a CPU enabled I/O interrupt signal from an I/O channel, the state of the PG bit position, and the state of the corresponding channel dedication mask bit position,
- whereby an output from the third ANDing means initiates CPU control switching from the guest SCP to the host SCP.

19. CPU control switch initiation means as defined in claim 16, further comprising:
- channel dedication mask registering means with preferred guest channel dedication mask bit positions corresponding to I/O channel numbers architected for the system, a first state of any channel dedication mask bit position indicating the preferred guest SCP is enabled to control the execution of I/O instructions for the corresponding channel and a second state of the bit position indicating the preferred guest SCP is not enabled to control the execution of I/O instructions for the corresponding channel,
- instruction unit signalling means for signalling the execution of an I/O instruction for a selected channel while the CPU is in privileged state,
- fourth ANDing means for receiving a signal from the instruction unit signalling means indicating pre-execution of an I/O instruction for a selected I/O channel, the state of the PG bit position, and the state of the corresponding channel dedication mask bit position,
- means for suppressing the CPU execution of the I/O instruction in response to an output from the fourth ANDing means,
- whereby an output from the fourth ANDing means initiates CPU control switching from the guest SCP to the host SCP.

20. CPU control switch initiation means as defined in claim 16, further comprising:
- instruction unit signalling means for signalling the execution of a system-control instruction while the CPU is in a privileged state,
- fifth ANDing means for receiving a signal from the instruction unit signalling means and the state of the PG bit position,
- means for suppressing the CPU execution of the system-control instruction in response to an output from the fifth ANDing means,
- whereby an output from the fifth ANDing means initiates CPU control switching from the guest SCP to the host SCP.

21. CPU control switch initiation means as defined in claim 16, further comprising:
- sixth ANDing means for receiving the CPU wait state from the PSW means and the state of the PG bit position,
- whereby an output from the sixth ANDing means initiates CPU control switching from the guest SCP to the host SCP.

22. A CPU control switching method as defined in claim 1, further comprising:
- providing a host PSA for each CPU in the system,
- selectively providing a guest PSA only for each CPU on which the guest SCP is to run,
- whereby the number of guest PSAs is independent of the number of host PSAs.

23. A CPU control switching method as defined in claim 6, in which the loading step further comprises:
- a host SCP being associated with the particular PSA in main storage,
- whereby the loading step switches the CPU to the host SCP.

24. A CPU control switching method as defined in claim 6, in which the loading step further comprises:
- a guest SCP being associated with the particular PSA in main storage,
- whereby the loading step switches the CPU to the guest SCP.

* * * * *